(12) United States Patent
Chen (10) Patent No.: US 12,372,198 B2
(45) Date of Patent: Jul. 29, 2025

(54) COMPOSITE FIXED BRACKET

(71) Applicant: ASKEY COMPUTER CORP., New Taipei (TW)

(72) Inventor: Chin-Hua Chen, New Taipei (TW)

(73) Assignee: ASKEY COMPUTER CORP., New Taipei (TW)

( * ) Notice: Subject to any disclaimer, the term of this patent is extended or adjusted under 35 U.S.C. 154(b) by 0 days.

(21) Appl. No.: 18/582,258

(22) Filed: Feb. 20, 2024

(65) Prior Publication Data
US 2024/0369179 A1 Nov. 7, 2024

(30) Foreign Application Priority Data
May 4, 2023 (TW) ................................. 112116669

(51) Int. Cl.
*F16M 13/02* (2006.01)
(52) U.S. Cl.
CPC .................................. *F16M 13/02* (2013.01)
(58) Field of Classification Search
CPC ..................................................... F16M 13/02
USPC ............................................. 248/200, 205.1
See application file for complete search history.

(56) References Cited

U.S. PATENT DOCUMENTS

| | | | |
|---|---|---|---|
| 12,245,387 B2* | 3/2025 | Jo ........................... | H01Q 1/246 |
| 2014/0117186 A1* | 5/2014 | Govindasamy ........ | F16M 11/16 |
| | | | 248/317 |
| 2016/0198838 A1* | 7/2016 | Abreu ..................... | A45C 11/00 |
| | | | 224/183 |

FOREIGN PATENT DOCUMENTS

CN 214839584 U 11/2021

* cited by examiner

*Primary Examiner* — Todd M Epps
(74) *Attorney, Agent, or Firm* — MUNCY, GEISSLER, OLDS & LOWE, P.C.

(57) ABSTRACT

A composite fixed bracket includes a device-end bracket, a fixed-end bracket and an auxiliary fixing bracket. The device-end bracket has first rotating-connecting parts and device connection parts connecting an electronic device. The fixed-end bracket has second rotating-connecting parts, first sliding-connecting parts and hole parts. The first and the second rotating-connecting parts are relatively rotated to fit and connect to each other for fixing the fixed-end and device-end brackets. The fixed-end bracket is located between the device-end bracket and the auxiliary fixing bracket. The auxiliary fixing bracket includes two fixing units, and each fixing unit includes two second sliding-connecting parts, an engaging part and a ring-fixing part. The second sliding-connecting parts are connected to the first sliding-connecting parts respectively, so the fixing units are slidably connected to the fixed-end bracket.

10 Claims, 7 Drawing Sheets

COMPOSITE FIXED BRACKET

CROSS REFERENCE TO RELATED APPLICATIONS

This Non-provisional application claims priority under 35 U.S.C. § 119 (a) on Patent Application No(s). 112116669 filed in Taiwan, Republic of China on May 4, 2023, the entire contents of which are hereby incorporated by reference.

BACKGROUND

Technology Field

The present disclosure relates to a composite fixed bracket.

Description of Related Art

There are many kinds of electronic products on the market, such as wireless routers, wireless access points (WAP), monitors, etc., which are usually installed at a specific position indoors. For example, these electronic products can be installed on the ceiling or the top region of a wall. One of the main considerations for the installation position is to reduce barriers to the wireless signal transmission.

Generally speaking, the electronic device is usually fixed on a specific position by a fixed bracket. For example, when the specific position is a wall surface, aa table surface or a partition surface, the electronic device can be assembled with a fixed bracket, and then the fixed bracket can be further fixed on the wall surface, the table surface, or the partition surface through a plurality of connection members (e.g. screws, rivets, drywall anchors, or the likes). In addition, when the specific position is a suspended ceiling system, the electronic device can be connected to the fixed bracket first, and then the fixed bracket can be installed on the ceiling frame (T-bar) by using a plurality of screws or fasteners.

Therefore, the operator usually needs to prepare different connection members, such as screws, rivets, drywall anchors, fasteners, etc., so as to install the fixed bracket assembled with the electronic device in different environments.

SUMMARY

In view of the foregoing, an objective of this disclosure is to provide a composite fixed bracket that can simultaneously provide different types of fixing structures for installing the electronic device in different environments.

To achieve the above, a composite fixed bracket, which is configured for fixing an electronic device, includes a device-end bracket, a fixed-end bracket and an auxiliary fixing bracket. The device-end bracket has a plurality of device connection parts and a plurality of first rotating-connecting parts. The device connection parts are used for connecting the electronic device. The fixed-end bracket has a plurality of second rotating-connecting parts, a plurality of first sliding-connecting parts and a plurality of hole parts. The first rotating-connecting parts and the second rotating-connecting parts are relatively rotated to fit and connect to each other, thereby relatively fixing the fixed-end bracket with the device-end bracket. The fixed-end bracket is located between the device-end bracket and the auxiliary fixing bracket. The auxiliary fixing bracket includes two fixing units, and each of the fixing units includes two second sliding-connecting parts, an engaging part and a ring-fixing part. The second sliding-connecting part of each fixing unit is connected to the first sliding-connecting part, so that the fixing units are slidably connected to the fixed-end bracket.

In one embodiment, a plurality of connection members are provided through the hole parts to fix the fixed-end bracket to a fixed surface.

In one embodiment, the connection members are screws, rivets, or drywall anchors.

In one embodiment, the fixed surface is a wall surface, a table surface, or a partition surface.

In one embodiment, the engaging parts of the fixing units are arranged opposite to each other for engaging a flat frame.

In one embodiment, the composite fixed bracket further includes two ring fasteners, and the two ring fasteners penetrate through the two ring-fixing parts respectively and further fix to a cylindrical body.

In one embodiment, the composite fixed bracket further includes a stop member, and the stop member is arranged between the device-end bracket and the fixed-end bracket for limiting a relative rotation of the device-end bracket and the fixed-end bracket.

In one embodiment, the device-end bracket further includes a contact part for contacting the electronic device.

In one embodiment, the contact part is configured with a plurality of openings.

In one embodiment, one of the device-end bracket and the fixed-end bracket is configured with an elastic lock part, and the other one of the device-end bracket and the fixed-end bracket is configured with a recess. When the fixed-end bracket and the device-end bracket are relatively rotated and fixed to each other, the elastic lock part is engaged and limited in the recess.

As mentioned above, in the composite fixed bracket of this disclosure, the fixed-end bracket has a plurality of hole parts, and the fixing units of the auxiliary fixing bracket include engaging parts and ring-fixing parts, so that the fixed-end bracket and the auxiliary fixing bracket can be fixed to different types of fixing structures, thereby installing the electronic device in different environments. For example, the connection members, such as screws, rivets, or drywall anchors, can be provided to penetrate the hole parts, respectively, for fixing the fixed-end bracket and the auxiliary fixing bracket on the wall surface, table surface, partition surface, or the likes. In addition, the positions of the fixing units can be adjusted, so that the engaging parts can directly engaged with the flat frame (e.g. T-bar). Moreover, the ring fasteners can be provided through the ring-fixing parts respectively so as to fix the fixed-end bracket and the auxiliary fixing bracket to a cylindrical body (e.g. pipe). As a result, the composite fixed bracket of this disclosure can simultaneously provide different types of fixing structures for installing the electronic device in different environments.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
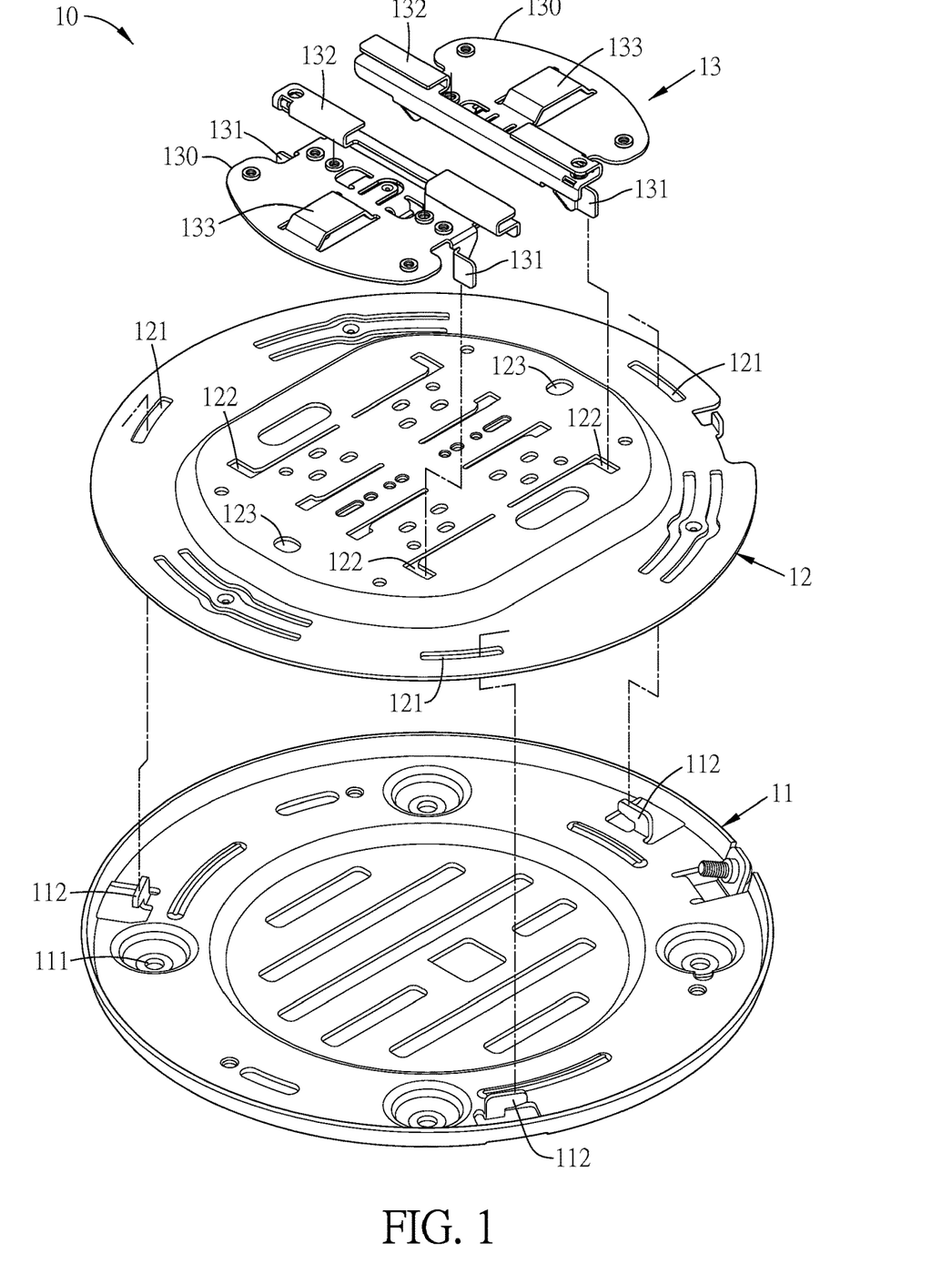
FIG. 1 is an exploded view of a composite fixed bracket according to an embodiment of this disclosure.

FIG. 1 is an exploded view of a composite fixed bracket 10 according to an embodiment of this disclosure.

Referring to FIG. 1, the composite fixed bracket 10 of this embodiment includes a device-end bracket 11, a fixed-end bracket 12, and an auxiliary fixing bracket 13. The composite fixed bracket 10 is configured for fixing an electronic device, and the fixed-end bracket 12 is located between the device-end bracket 11 and the auxiliary fixing bracket 13.

Figure 2:
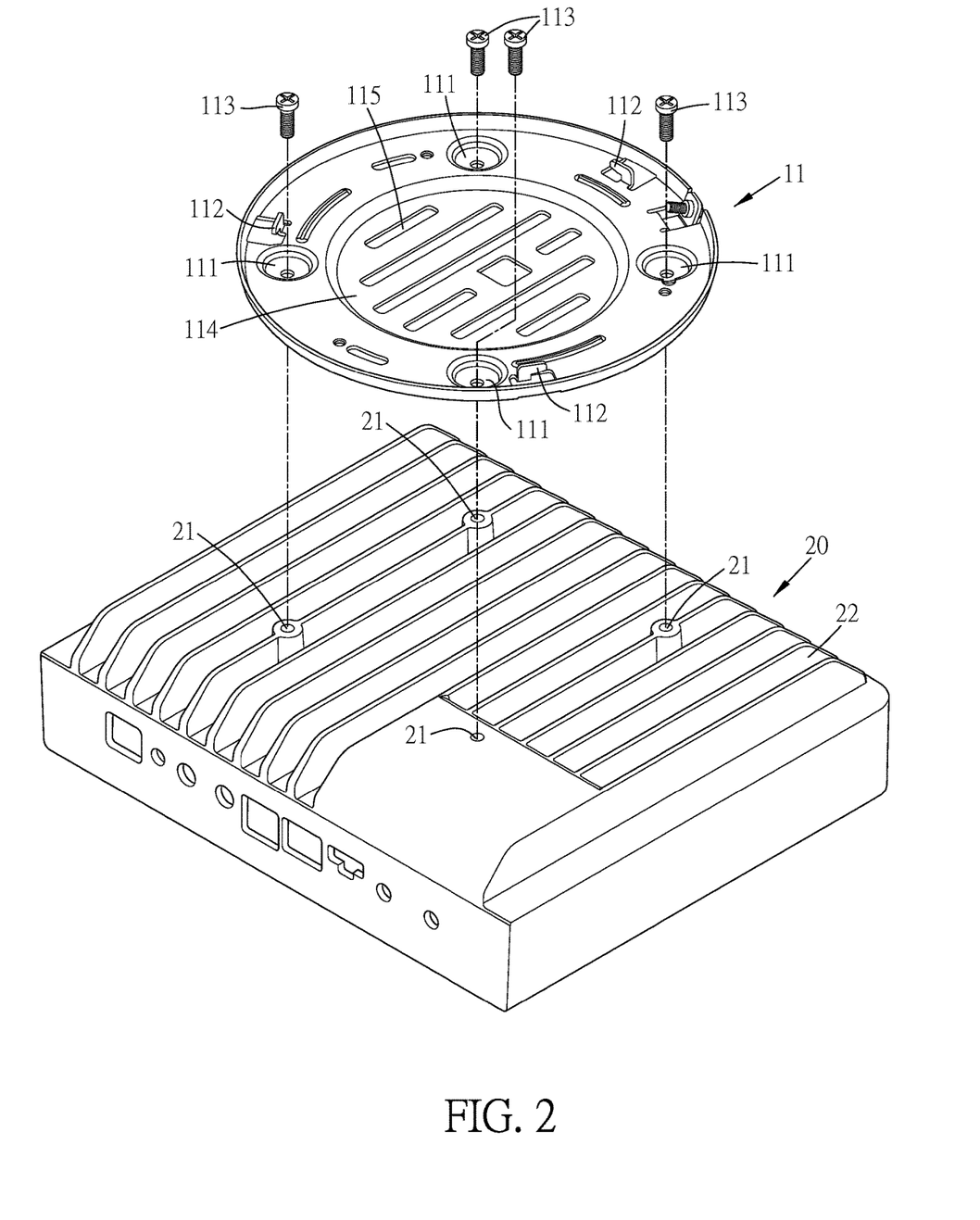
FIG. 2 is a schematic diagram showing the device-end bracket of the composite fixed bracket according to the embodiment of this disclosure, wherein an electronic device is connected to the device-end bracket.

FIG. 2 is a schematic diagram showing that the device-end bracket 11 is connected to an electronic device 20. With reference to FIGS. 1 and 2, in this embodiment, the device-end bracket 11 has a plurality of device connection parts 111 and a plurality of first rotating-connecting parts 112. The device connection parts 111 are used for connecting the electronic device 20. As shown in FIG. 2, the electronic device 20 is, for example, a network electronic product such as a wireless router or a wireless access points (WAP). The device connection parts 111 can be multiple connection holes, and a plurality of connection members 113 (e.g. screws) are provided through the corresponding device connection parts 111 and fastened to the corresponding screw holes 21 on the electronic device 20, thereby connecting the device-end bracket 11 to the electronic device 20.

In addition, the device-end bracket 11 can further include a contact part 114 for contacting the electronic device 20. In this embodiment, the contact part 114 can be configured with a plurality of openings 115. The amount and shape of the openings 115 can be any design based on the actual requirements, and this disclosure is not limited. As shown in FIG. 2, the contact part 114 has a sink design for contacting the top side of the electronic device 20, such as the heat-dissipation fins 22 arranged on the top of the electronic device 20. The design and configuration of the contact part 114 and the openings 115 can further assist the heat dissipation of the electronic device 20.

Referring to FIG. 1 again, the fixed-end bracket 12 has a plurality of second rotating-connecting parts 121, a plurality of first sliding-connecting parts 122, and a plurality of hole parts 123. In this embodiment, the first rotating-connecting parts 112 and the second rotating-connecting parts 121 are relatively rotated to fit and connect to each other, thereby relatively fixing the fixed-end bracket 12 with the device-end bracket 11. The auxiliary fixing bracket 13 includes two fixing units 130, and each fixing unit 130 includes two second sliding-connecting parts 131, an engaging part 132, and a ring-fixing part 133. The two second sliding-connecting parts 131 of each fixing unit 130 are connected to the two first sliding-connecting parts 122 of the fixed-end bracket 12, so that the fixing units 130 can be slidably connected to the fixed-end bracket 12.

In this embodiment, the fixed-end bracket 12 includes three second rotating-connecting parts 121, and the device-end bracket 11 includes three corresponding first rotating-connecting parts 112. In this case, the first rotating-connecting parts 112 are protruding hooks, and the second rotating-connecting parts 121 are arc grooves. The protruding hooks can be inserted into the corresponding arc grooves, respectively, and then the device-end bracket 11 is rotated with respect to the fixed-end bracket 12 until that the first rotating-connecting parts 112 are engaged with the second rotating-connecting parts 121. To be noted, the above-mentioned structural design and amounts are for an illustration only. Those skilled in the art may use other suitable structural designs to achieve the same connection effect, and this disclosure is not limited thereto.

Figure 3:
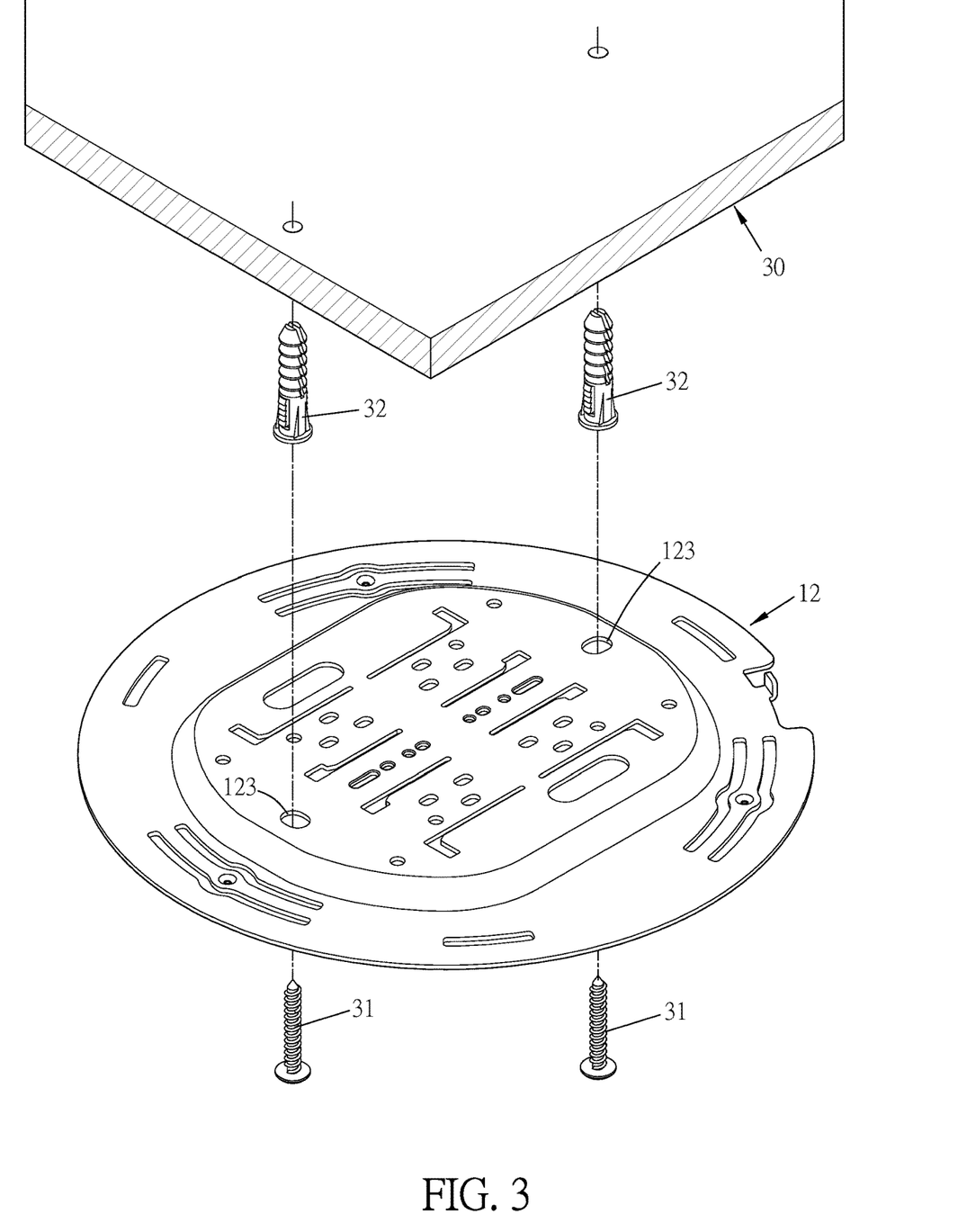
FIG. 3 is a schematic diagram showing the fixed-end bracket and the auxiliary fixing bracket, which are fixed on the fixed surface, according to the embodiment of this disclosure.

Please refer to FIG. 3. In this embodiment, the fixed-end bracket 12 has two hole parts 123, and a plurality of connection members are provided through the hole parts 123 to fix the fixed-end bracket 12 to a fixed surface. For example, the fixed surface can be a wall surface, a table surface, a partition surface, or any structure on which the composite fixing bracket 10 and the electronic device 20 can mount. As shown in FIG. 3, the fixed surface is a ceiling wall surface 30, and two screws 31 and two corresponding drywall anchors 32 (also known as wall plug) can be provided through the hole parts 123 for fixing the fixed-end bracket 12 on the ceiling wall surface 30. In practice, the first step is to drill holes on the ceiling wall surface 30 corresponding to the positions of the two hole parts 123, and then to insert the two drywall anchors 32 into the holes on the ceiling wall surface 30. Afterwards, the fixed-end bracket 12 is placed on the ceiling wall surface 30, and the positions of the two hole parts 123 are aligned to the positions of the drywall anchors 32 respectively. Then, the two screws 31 are provided respectively through the two hole parts 123 and screwed into the drywall anchors 32, so that the fixed-end bracket 12 can be fixed on the ceiling wall surface 30. In this embodiment, as shown in FIG. 3, it is unnecessary to assemble the auxiliary fixing bracket 13 on the fixed-end bracket 12, and the fixed-end bracket 12 (without the auxiliary fixing bracket 13) is directly installed on the ceiling wall surface 30. In other embodiments, the auxiliary fixing bracket 13 can be assembled with the fixed-end bracket 12 (not shown) before the fixed-end bracket 12 is fixed to the ceiling wall surface 30, and this disclosure is not limited thereto. It should be noted that the above-mentioned structural design and the amount thereof are for an illustration only. Those skilled in the art may use other suitable structural designs to achieve the same connection effect, and this disclosure is not limited thereto. For example, the connection members can be rivets, screws, drywall anchors, or any combination thereof.

Figure 4A:
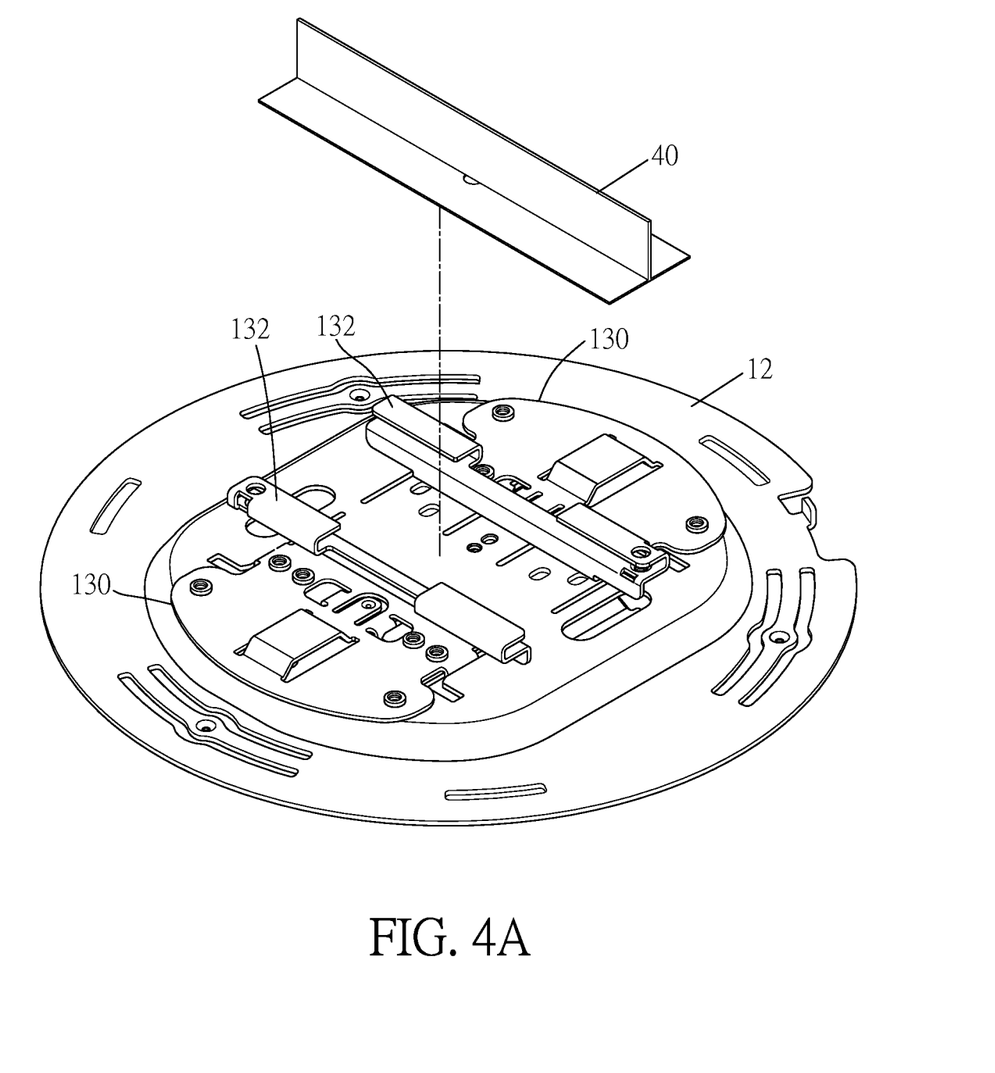
FIGS. 4A and 4B are schematic diagrams showing the fixed-end bracket and the auxiliary fixing bracket, which are fixed on the flat frame, according to the embodiment of this disclosure.
Figure 4B:
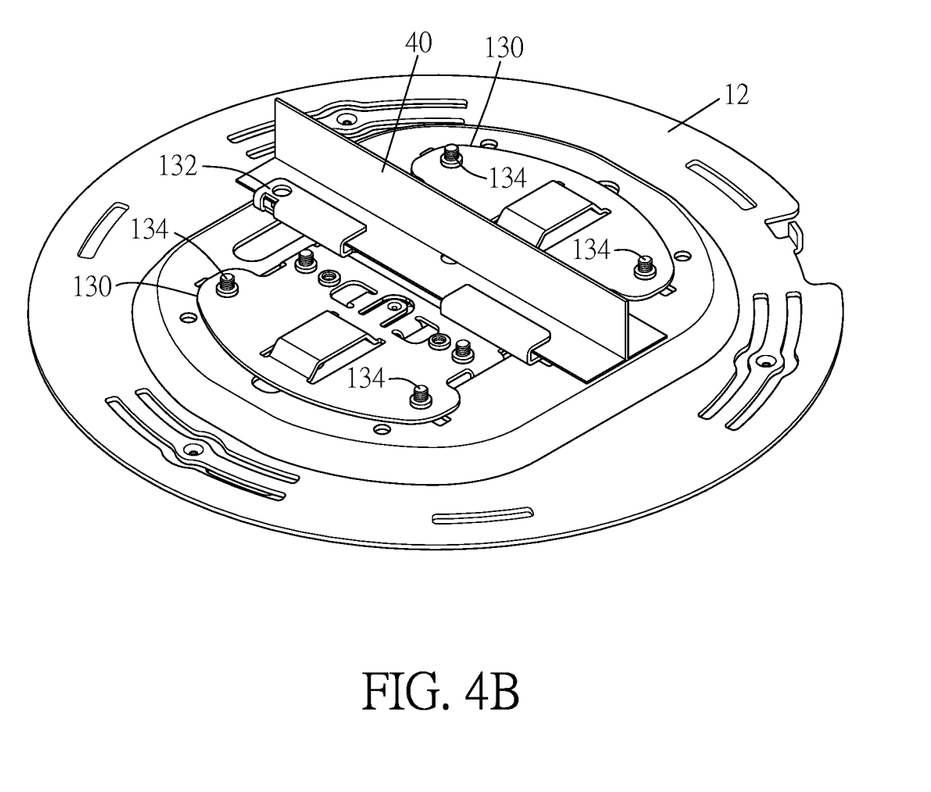

Please refer to FIGS. 1, 4A and 4B, wherein FIGS. 4A and 4B are schematic diagrams showing the fixed-end bracket 12 and the auxiliary fixing bracket 13, which are fixed on the flat frame 40. As shown in FIG. 1, in this embodiment, the fixed-end bracket 12 includes four first sliding-connecting parts 122, which are respectively connected to four second sliding-connecting parts 131 of the two fixing units 130. In this case, each first sliding-connecting part 122 is an L-shaped groove, and each second sliding-connecting part 131 is an L-shaped protrusions. Accordingly, each second sliding-connecting part 131 can be inserted into the corresponding first sliding-connecting part 122, and can move along the first sliding-connecting part 122, thereby adjusting the relative distance between the two fixing units 130. In practice, after the second sliding-connecting parts 131 are respectively inserted into the corresponding first sliding-connecting parts 122, the two fixing units 130 can be moved to the positions of the maximum relative distance (as shown in FIG. 4A). Then, the two fixing units 130 are approached to a flat frame 40, so that the two engaging parts 132 are respectively arranged at two sides of the flat frame 40. The flat frame 40 of this embodiment is, for example, a ceiling frame (T-bar). Afterwards, the two fixing units 130 are moved towards each other until the two engaging parts 132 are engaged with the flat frame 40. Finally, a plurality of screws 134 are provided to fix the two fixing units 130 on the fixed-end bracket 12 (as shown in FIG. 4B).

Figure 5:
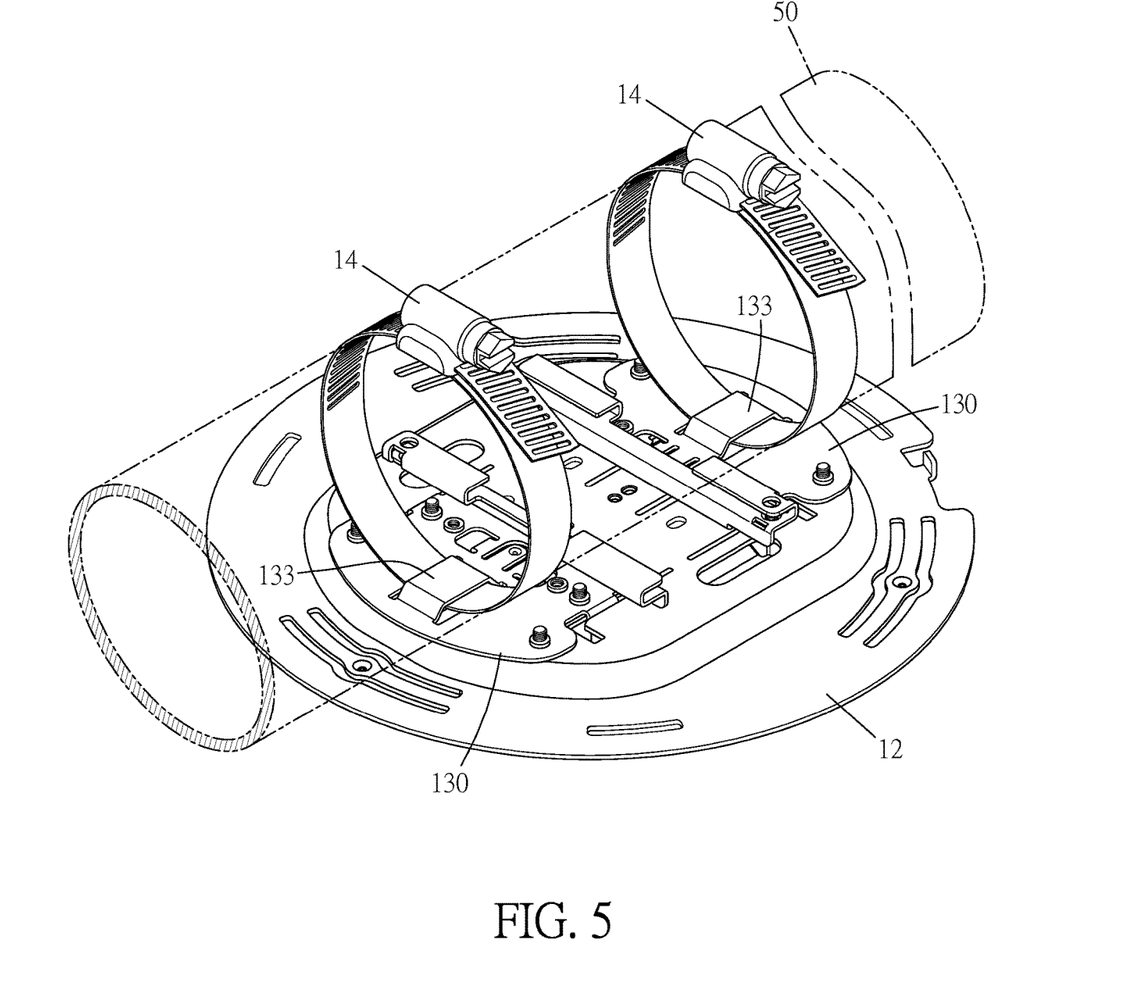
FIG. 5 is a schematic diagram showing the fixed-end bracket and the auxiliary fixing bracket, which are fixed on the cylindrical body, according to the embodiment of this disclosure.

Please refer to FIG. 5, wherein FIG. 5 is a schematic diagram showing the fixed-end bracket 12 and the auxiliary fixing bracket 13, which are fixed on the cylindrical body 50. In this embodiment, each fixing unit 130 includes a ring-fixing part 133, and the composite fixing bracket 10 further includes two ring fasteners 14, which respectively penetrate through the corresponding ring-fixing parts 133 and further fix to a cylindrical body 50. In practice, after the second sliding-connecting parts 131 are respectively inserted into the corresponding first sliding-connecting parts 122, the two fixing units 130 can be fixed on the fixed-end bracket 12. Then, the two ring fasteners 14 are penetrated through the corresponding ring-fixing parts 133 respectively, and the two ring fasteners 14 are further fixed to the cylindrical body 50 (as shown in FIG. 5). It should be noted that the above-mentioned structural design and the amount thereof are for an illustration only. Those skilled in the art may use other suitable structural designs to achieve the same connection effect, and this disclosure is not limited thereto. For example, the cylindrical body 50 can be a circular cylinder, an elliptical cylinder, a square cylinder, etc. (such as a water pipe, a steel pipe, a wooden strip, or the likes), and this disclosure is not limited thereto.

Figure 6:
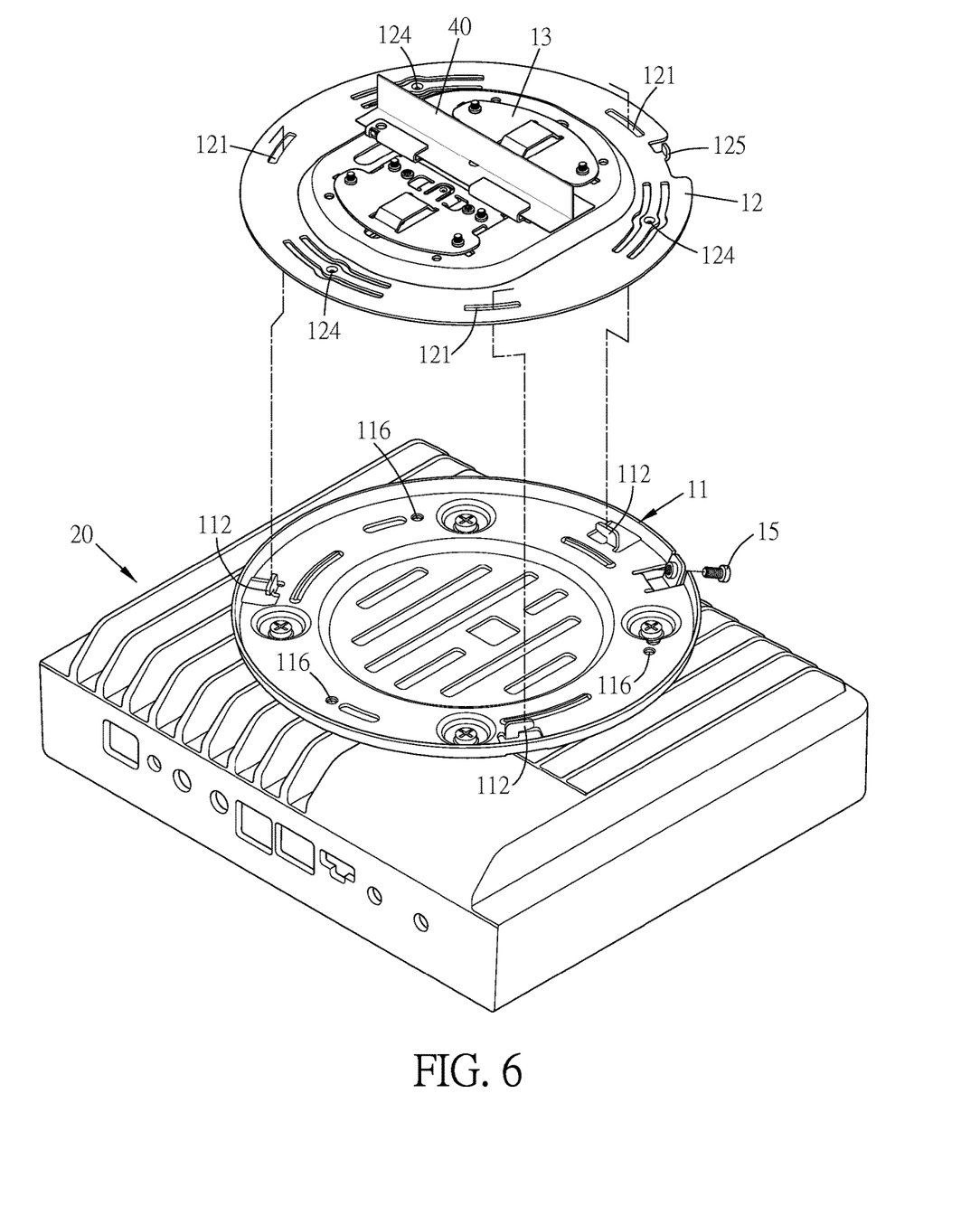
FIG. 6 is a schematic diagram showing the composite fixed bracket according to the embodiment of this disclosure, wherein an electronic device is connected to the device-end bracket, the fixed-end bracket and the auxiliary fixing bracket are fixed on the flat frame, and the device-end bracket and the fixed-end bracket are not relatively rotated and fixed to each other yet.

Please refer to FIG. 6. FIG. 6 is a schematic diagram showing the composite fixed bracket 10, wherein an electronic device 20 is connected to the device-end bracket 11, the fixed-end bracket 12 and the auxiliary fixing bracket 13 are fixed on the flat frame 40. Then, the device-end bracket 11 and the fixed-end bracket 12 are relatively rotated and fixed to each other, thereby finishing the operation of installing the electronic device 20. Specifically, in order to installing the electronic device 20 in an indoor environment including a suspended ceiling system, the device-end bracket 11 can be separated from the fixed-end bracket 12 first, and then directly connected to the electronic device 20. After the fixed-end bracket 12 is assembled with the auxiliary fixed bracket 13, the assembled structure is installed on the flat frame 40 (T-bar). Afterwards, the first rotating-connecting parts 112 of the device-end bracket 11 are aligned to and inserted into the corresponding second rotating-connecting parts 121 of the fixed-end bracket 12, and then the device-end bracket 11 is rotated to the end, so that the first rotating-connecting parts 112 and the second rotating-connecting parts 121 can be relatively rotated and fitted with each other, thereby completing the installation step of the electronic device 20.

In addition, one of the device-end bracket 11 and the fixed-end bracket 12 can be configured with an elastic lock part, while the other one thereof is configured with a recess. In this embodiment, the device-end bracket 11 is configured with three recesses 116, while the fixed-end bracket 12 is configured with three elastic lock parts 124. When the fixed-end bracket 12 and the device-end bracket 11 are relatively rotated and fixed to each other, the elastic lock parts 124 can be engaged and limited in the corresponding recesses 116, respectively. This structural design can facilitate to firmly fix the relative positions of the fixed-end bracket 12 and the device-end bracket 11 when installing the electronic device 20. That is, the fixed-end bracket 12 and the device-end bracket 11 cannot relatively rotate with respect to each other when installing the electronic device 20. Moreover, the composite fixed bracket 10 can further include a stop member 15, which is arranged between the device-end bracket 11 and the fixed-end bracket 12 for limiting a relative rotation of the device-end bracket 11 and the fixed-end bracket 12. In this embodiment, as shown in FIG. 6, the stop member 15 is a screw, which is threaded into one side of the device-end bracket 11. In practice, the stop member 15 can be removed before assembling the device-end bracket 11 and the fixed-end bracket 12, and it can be threaded into one side of the device-end bracket 11 after assembling the device-end bracket 11 and the fixed-end bracket 12. Accordingly, the tail of the stop member 15 can contact against a protrusion 125 of the fixed-end bracket 12, thereby achieving the purpose of limiting the relative rotation of the device-end bracket 11 and the fixed-end bracket 12. To be noted, the above-mentioned structural design and amounts are for an illustration only. Those skilled in the art may use other suitable structural designs to achieve the same effect, and this disclosure is not limited thereto.

To sum up, in the composite fixed bracket of this disclosure, the fixed-end bracket has a plurality of hole parts, and the fixing units of the auxiliary fixing bracket include engaging parts and ring-fixing parts, so that the fixed-end bracket and the auxiliary fixing bracket can be fixed to different types of fixing structures, thereby installing the electronic device in different environments. For example, the connection members, such as screws, rivets, or drywall anchors, can be provided to penetrate the hole parts, respectively, for fixing the fixed-end bracket and the auxiliary fixing bracket on the wall surface, table surface, partition surface, or the likes. In addition, the positions of the fixing units can be adjusted, so that the engaging parts can directly engaged with the flat frame (e.g. T-bar). Moreover, the ring fasteners can be provided through the ring-fixing parts respectively so as to fix the fixed-end bracket and the auxiliary fixing bracket to a cylindrical body (e.g. pipe). As a result, the composite fixed bracket of this disclosure can simultaneously provide different types of fixing structures for installing the electronic device in different environments.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A composite fixed bracket for fixing an electronic device, comprising:

a device-end bracket having a plurality of device connection parts and a plurality of first rotating-connecting parts, wherein the device connection parts are used for connecting the electronic device;

a fixed-end bracket having a plurality of second rotating-connecting parts, a plurality of first sliding-connecting parts and a plurality of hole parts, wherein the first rotating-connecting parts and the second rotating-connecting parts are relatively rotated to fit and connect to each other, thereby relatively fixing the fixed-end bracket with the device-end bracket; and an auxiliary fixing bracket, wherein the fixed-end bracket is located between the device-end bracket and the auxiliary fixing bracket, the auxiliary fixing bracket comprises two fixing units, each of the fixing units comprises two second sliding-connecting parts, an engaging part and a ring-fixing part, and the second sliding-connecting part of each of the fixing units is connected to the first sliding-connecting part, so that the fixing units are slidably connected to the fixed-end bracket.

2. The composite fixed bracket of claim 1, wherein a plurality of connection members are provided through the hole parts to fix the fixed-end bracket to a fixed surface.

3. The composite fixed bracket of claim 2, wherein the connection members are screws, rivets, or drywall anchors.

4. The composite fixed bracket of claim 2, wherein the fixed surface is a wall surface, a table surface, or a partition surface.

5. The composite fixed bracket of claim 1, wherein the engaging parts of the fixing units are arranged opposite to each other for engaging a flat frame.

6. The composite fixed bracket of claim 1, further comprising two ring fasteners, wherein the two ring fasteners penetrate through the two ring-fixing parts respectively and further fix to a cylindrical body.

7. The composite fixed bracket of claim 1, further comprising a stop member, wherein the stop member is arranged between the device-end bracket and the fixed-end bracket for limiting a relative rotation of the device-end bracket and the fixed-end bracket.

8. The composite fixed bracket of claim 1, wherein the device-end bracket further comprises a contact part for contacting the electronic device.

9. The composite fixed bracket of claim 8, wherein the contact part is configured with a plurality of openings.

10. The composite fixed bracket of claim 1, wherein one of the device-end bracket and the fixed-end bracket is configured with an elastic lock part, the other one of the device-end bracket and the fixed-end bracket is configured with a recess, and when the fixed-end bracket and the device-end bracket are relatively rotated and fixed to each other, the elastic lock part is engaged and limited in the recess.

* * * * *